US012425551B2

(12) United States Patent
Campos Macias et al.

(10) Patent No.: US 12,425,551 B2
(45) Date of Patent: Sep. 23, 2025

(54) ENHANCED OCCUPANT COLLISION SAFETY SYSTEM

(71) Applicant: Intel Corporation, Santa Clara, CA (US)

(72) Inventors: Leobardo Campos Macias, Guadalajara (MX); Julio Zamora Esquivel, Zapopan (MX); Javier Felip Leon, Hillsboro, OR (US); David Gonzalez Aguirre, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 764 days.

(21) Appl. No.: 17/482,842

(22) Filed: Sep. 23, 2021

(65) Prior Publication Data
US 2022/0009439 A1 Jan. 13, 2022

(51) Int. Cl.
*B60R 21/0136* (2006.01)
*G06F 18/23* (2023.01)
(Continued)

(52) U.S. Cl.
CPC ......... *H04N 7/188* (2013.01); *B60R 21/0136* (2013.01); *G06F 18/23* (2023.01);
(Continued)

(58) Field of Classification Search
CPC ........ G06V 40/10; G06V 10/82; G06V 20/44; G06V 20/59; B60R 21/015; B60R 21/02;
(Continued)

(56) References Cited

U.S. PATENT DOCUMENTS

| 4,995,639 A | * | 2/1991 | Breed | B60R 21/0136 180/274 |
| 5,322,323 A | * | 6/1994 | Ohno | B60R 21/0132 280/730.2 |

(Continued)

FOREIGN PATENT DOCUMENTS

| CN | 115891895 | 4/2023 |
| DE | 102022121324 | 3/2023 |

OTHER PUBLICATIONS

Gallego, Guillermo, "Event-based Vision: A Survey", Computer Science, Medicine IEEE transactions of pattern analysis and machine intelligence, (2020), 30 pgs.
(Continued)

*Primary Examiner* — Mussa A Shaawat
(74) *Attorney, Agent, or Firm* — Schwegman Lundberg & Woessner, P.A.

(57) ABSTRACT

Various systems and methods for implementing an enhanced occupant collision safety system in a vehicle are described herein. A system for controlling deployment of vehicle safety mechanisms of a host vehicle, includes a sensor array interface to receive acceleration data from an impact sensor; an image processor to receive events from an event camera, the event camera configured to monitor a scene of an interior of the host vehicle that includes an occupant; and an occupant safety system controller to: cluster the events to discriminate between events associated with a background of the scene and events associated with a body part of the occupant; detect a collision based on the acceleration data; verify the collision based on the events associated with the background of the scene; and in response to verifying the collision, cause a collision safety mechanism of the host vehicle to deploy.

23 Claims, 11 Drawing Sheets

(51) Int. Cl.
  *G06K 9/00*       (2022.01)
  *G06K 9/62*       (2022.01)
  *G06V 10/82*      (2022.01)
  *G06V 20/40*      (2022.01)
  *G06V 20/59*      (2022.01)
  *H04N 7/18*       (2006.01)
  *B60R 21/01*      (2006.01)

(52) U.S. Cl.
  CPC .............. *G06V 10/82* (2022.01); *G06V 20/44* (2022.01); *G06V 20/59* (2022.01); *H04N 7/18* (2013.01); *B60R 2021/01252* (2013.01); *B60R 2021/01286* (2013.01)

(58) Field of Classification Search
  CPC ........ B60R 21/013; B60R 2021/01315; B60R 21/0136; B60R 2021/01252; B60R 2021/01286; B60R 21/0132; H03N 7/188; H03N 7/18
  See application file for complete search history.

(56) References Cited

U.S. PATENT DOCUMENTS

| | | | | |
|---|---|---|---|---|
| 8,447,472 | B2* | 5/2013 | Joh | G01S 13/931 |
| | | | | 701/45 |
| 8,554,461 | B2* | 10/2013 | Cuddihy | B60R 21/0134 |
| | | | | 340/436 |
| 8,768,573 | B2* | 7/2014 | Breed | B60W 40/06 |
| | | | | 340/440 |
| 9,817,397 | B1* | 11/2017 | Larner | B60R 21/013 |
| 11,872,951 | B1* | 1/2024 | Damasio Simoes De Oliveira .... B60R 21/23138 |
| 2001/0028163 | A1* | 10/2001 | Breed | B60J 10/00 |
| | | | | 180/274 |
| 2003/0155753 | A1* | 8/2003 | Breed | B60R 19/483 |
| | | | | 280/735 |
| 2004/0036261 | A1* | 2/2004 | Breed | B60R 21/0136 |
| | | | | 280/735 |
| 2006/0187009 | A1* | 8/2006 | Kropinski | G01S 15/931 |
| | | | | 342/70 |
| 2006/0232052 | A1* | 10/2006 | Breed | B60R 21/013 |
| | | | | 280/735 |
| 2007/0075919 | A1* | 4/2007 | Breed | B60R 21/0132 |
| | | | | 345/8 |
| 2008/0211908 | A1* | 9/2008 | Dvir | G08B 13/19604 |
| | | | | 348/E5.065 |
| 2010/0213693 | A1* | 8/2010 | Foo | B60R 21/0136 |
| | | | | 280/735 |
| 2015/0318015 | A1* | 11/2015 | Bose | G08B 21/043 |
| | | | | 386/248 |
| 2019/0258263 | A1* | 8/2019 | Wendel | B60R 21/01556 |
| 2020/0005468 | A1* | 1/2020 | Paul | H04N 25/47 |
| 2020/0339056 | A1* | 10/2020 | Kriger | B60R 21/01516 |
| 2021/0110197 | A1* | 4/2021 | Zamora | G06N 3/048 |
| 2021/0136572 | A1* | 5/2021 | Ingraham | H04W 12/069 |
| 2022/0379830 | A1* | 12/2022 | Ha | B60R 21/0132 |
| 2023/0158981 | A1* | 5/2023 | Woo Lee | B60R 21/213 |
| | | | | 701/45 |
| 2023/0211746 | A1* | 7/2023 | Delev | B60R 21/0136 |
| | | | | 340/436 |
| 2024/0323035 | A1* | 9/2024 | Ryu | G06F 16/29 |

OTHER PUBLICATIONS

Levant, Arie, "Robust exact filtering differentiators", European Journal of Control 55, (2020), 33-44.

* cited by examiner

ENHANCED OCCUPANT COLLISION SAFETY SYSTEM

TECHNICAL FIELD

Embodiments described herein generally relate to vehicle restraint systems, and in particular, to an enhanced occupant collision safety system.

BACKGROUND

An occupant restraint system (ORS) is used to protect a vehicle's occupants. An ORS may include mechanisms such as a lap belt, a seat belt, and one or more airbags. Airbags may be installed in various locations in the cabin of the vehicle and activated during a collision.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
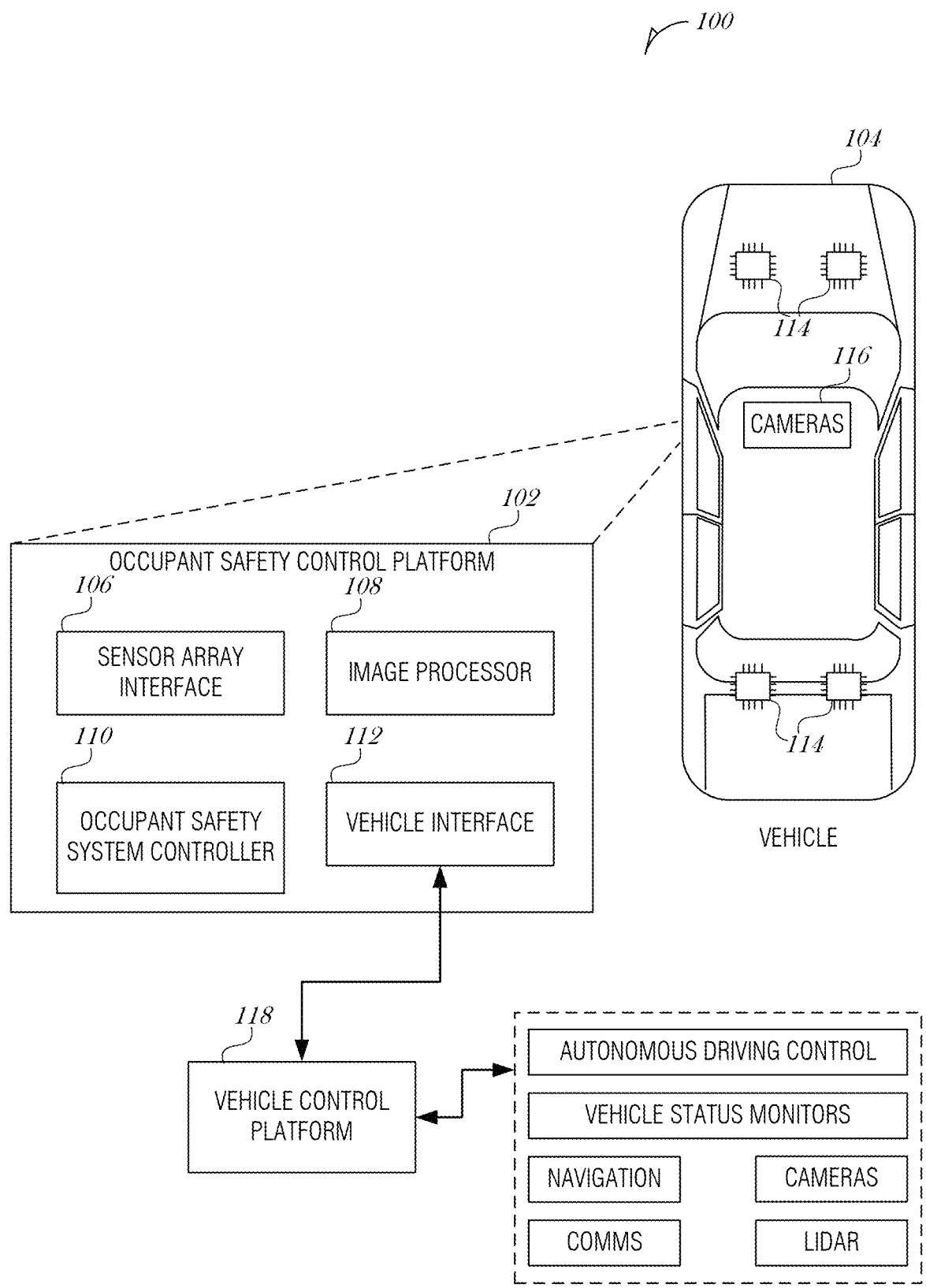
FIG. 1 is a schematic drawing illustrating an operating environment, according to an embodiment.

In the following description, for purposes of explanation, numerous specific details are set forth in order to provide a thorough understanding of some example embodiments. It will be evident, however, to one skilled in the art that the present disclosure may be practiced without these specific details.

Occupant restraint systems (ORS) may be controlled by an electronic system in the vehicle. The ORS may include sensors that detect the initial impact during a collision and activate one or more mechanisms of the ORS to protect vehicle occupants. For instance, the ORS may include airbags installed in a dash, steering wheel, and side and front pillars. Based on the direction and severity of the impact, airbags may be selectively activated with specific timing.

Current sensors used in ORS systems are unable to process data at enough high speeds inside the cabin to react to a collision. For instance, most vehicle collisions last for only 70 to 150 milliseconds. While there are some expensive devices that can sense at those frame rates, the data cannot be processed fast enough to compute a decision and activate the ORS.

In many conventional implementations, a finite amount of impact sensors are located in strategic positions around the vehicle. Impact sensors are usually based only on sensed acceleration and the calculated jerk. Jerk is the first derivative of acceleration. Control signals to the ORS are generated based on thresholds for these measurements. The decision to activate and the timing of activation of the airbags are based on only those signals. Airbag deployment timing must consider that airbags should fully deploy before occupants strike any portion of the vehicle interior or reach the limit of the seat belt slack.

The capability to monitor in-cabin activity at high speeds can significantly improve the ORS triggering signals. This is something that collision detection sensors are unable to perform. In-cabin monitoring is particularly important for activating the airbags well before maximum seat belt engagement occurs to enhance the protection of the users.

Not having in-cabin monitoring feedback can lead to false positives, activating airbags when no collision has occurred—or even worse, activating them at the wrong time, causing injuries to the occupants. Besides, using only a threshold-based system is difficult to tune because the signals are very different across a diversity of collision scenarios. Acceleration and jerk signals vary from a head-on collision to a side collision, making it difficult to tune sensors for collisions at an angle. Moreover, the lack of sensing awareness over low-latency fine displacements inside the cabin allows for only applying generalized strategies to every passenger.

While standard CMOS RGB cameras have become popular to monitor user actions and improve driving assistance, such cameras capture the light over the entire scene at a fixed frame rate, this produces large motion blur (specially within the in-cabin range) in abrupt movements. In addition, processing a full frame image, which includes pixels that may not be relevant, increases computation time. As such, standard RGB cameras are often not suitable as sensors for an ORS.

In contrast, event cameras are able to sense hundreds of times faster than traditional cameras, some even up to 10,000 frames per section (e.g., 10 KHz). As a result, changes in the scene can be detected quickly, allowing greater anticipation than RGB cameras. Further, the high frame rate reduces or eliminates image blur. Also, the sparsity of the events captured by an event camera ensures that only information about moving objects are captured, and not the entire scene as with RGB cameras. This results in a lower computational load.

This disclosure describes a system that incorporates event cameras to monitor passenger positions with acceleration measurements from an inertial measurement unity (IMU) to improve ORS responsiveness and effectiveness. The system includes a framework that combines event-based camera data with acceleration from IMU measurements to calculate the trajectory of the vehicle occupants at high speeds. The higher frame rate and reduced data complexity allows the system to analyze and make the necessary calculations to control an ORS within the time period of a typical collision. In the event of a collision, it is robustly detected, and the computed trajectories of the passengers are used to enhance the activation of the ORS.

The improved sensor system described herein realizes several advantages for in-cabin monitoring including better discrimination and determination of passenger movement during a collision, more accurate per-passenger timing when triggering airbags or other safety systems, and reducing false positives when detecting direction and magnitude of collisions. These improvements may reduce injuries caused by slow reacting airbags, misfiring airbags, or the like.

Further, the improved sensor system may implement advanced filtering and classification methods to identify objects or events that can be used to provide input to or control an ORS. The improved sensor system also provides advantages over vehicles that are equipped with more rudimentary sensor systems that do not use image data in combination with physics data. These advantages and others are described further herein.

FIG. 1 is a schematic drawing illustrating an operating environment 100, according to an embodiment. FIG. 1 includes an occupant safety control platform 102 incorporated into the vehicle 104. The occupant safety control platform 102 includes a sensor array interface 106, an image processor 108, an occupant restraint system (ORS) controller 110, and a vehicle interface 112.

The vehicle 104, which may also be referred to as an "ego vehicle" or "host vehicle", may be any type of vehicle, such as a commercial vehicle, a consumer vehicle, a recreation vehicle, a car, a truck, an autonomous vehicle, or a vehicle able to operate at least partially in an autonomous mode. The vehicle 104 may operate sometimes in a manual mode where the driver operates the vehicle 104 conventionally using pedals, a steering wheel, or other controls. At other times, the vehicle 104 may operate in a fully autonomous mode, where the vehicle 104 operates without user intervention. In addition, the vehicle 104 may operate in a semi-autonomous mode, where the vehicle 104 controls many of the aspects of driving, but the driver may intervene or influence the operation using conventional (e.g., steering wheel) and non-conventional inputs (e.g., voice control).

The vehicle 104 may include one or more impact sensors 114 that are capable of detecting collisions with the vehicle 104. The impact sensors 114 may include an inertial measurement unit (IMU) that measures the specific force, angular rate, or orientation of the impact sensor 114 using a combination of accelerometers, gyroscopes, or magnetometers.

The impact sensors 114 may be disposed at strategic positions in the body of the vehicle 104. For example, impact sensors 114 may be placed on or near front and rear bumper, on or near the A pillar (e.g., vertical structure that supports front windshield and front portion of roof) or windshield, on or near the B pillar (e.g., vertical structure between front and rear doors on a 4-door vehicle), on or near the C pillar (e.g., vertical structure to support roof behind rear door), on or near the D pillar (e.g., vertical structure to support roof at rear of vehicle on a 4-door wagon or van), rear window, or other locations on the vehicle 104. It is understood that the impact sensors 114 may be incorporated into any portion of the vehicle 104. The impact sensors 114 may provide signals to the occupant safety control platform 102 through the sensor array interface 106.

The vehicle 104 may include one or more event cameras 116 that are capable of capturing image data of vehicle occupants. An event camera includes an image sensor or imaging sensor that responds to local changes in brightness. As such, event cameras are not used to capture full frame images like conventional RGB cameras. Instead, each pixel inside an event camera operates independently and asynchronously. Each pixel reports changes in brightness as they occur. Event cameras have microsecond temporal resolution, high dynamic range, and less motion blur than RGB full frame cameras.

An event camera uses pixels that respond to brightness changes. A pixel stores a reference brightness level and compares to the current brightness. If the difference exceeds a threshold, the pixel reports an event. In conjunction with reporting the event, the pixel resets its reference brightness level to the current brightness and continues comparing brightness values to the new reference brightness level.

Events may be represented as a message including the pixel's address and a timestamp. Events may also contain the direction (increase or decrease) of a brightness change. Events may also include an instantaneous measurement of the current level of illumination. Event cameras output a nearly continuous asynchronous stream of event messages that are triggered by changes in scene illumination.

The sensor array interface 106 may be used to interface with one or more sensors installed on the vehicle 104. Examples of sensors include, but are not limited to impact sensors 114; event cameras 116; microphones; forward, side, or rearward facing cameras; radar; LiDAR; ultrasonic distance measurement sensors; or other sensors. Forward-facing or front-facing is used in this document to refer to the primary direction of travel, the direction the seats are arranged to face, the direction of travel when the transmission is set to drive, or the like. Conventionally then, rear-facing or rearward-facing is used to describe sensors that are directed in a roughly opposite direction than those that are forward or front-facing. It is understood that some front-facing cameras may have a relatively wide field of view, even up to 180-degrees. Similarly, a rear-facing camera that is directed at an angle (e.g., 60-degrees off center) to be used to detect traffic in adjacent traffic lanes, may also have a relatively wide field of view, which may overlap the field of view of the front-facing camera. Side-facing sensors are those that are directed outward from the sides of the vehicle 104. Cameras in the sensor array may include infrared or visible light cameras, able to focus at long-range or short-range with narrow or large fields of view.

The vehicle 104 may also include various other sensors, which may be installed inside the cabin of the vehicle, such as driver identification sensors (e.g., a seat sensor, an eye tracking and identification sensor, a fingerprint scanner, a voice recognition module, or the like), or occupant or seat sensors. Sensors may also be installed to monitor conditions outside the vehicle, such as various environmental sensors to detect wind velocity, outdoor temperature, barometer pressure, rain/moisture, or the like.

Sensor data is used to determine the vehicle's operating context, environmental information, road conditions, travel conditions, or the like. The sensor array interface 106 may communicate with another interface, such as an onboard navigation system, of the vehicle 104 to provide or obtain sensor data. Components of the occupant safety control platform 102 may communicate with components internal to the occupant safety control platform 102 or components that are external to the platform 102 using a network, which may include local-area networks (LAN), wide-area networks (WAN), wireless networks (e.g., 802.11 or cellular network), ad hoc networks, personal area networks (e.g., Bluetooth), vehicle-based networks (e.g., Controller Area Network (CAN) BUS), or other combinations or permutations of network protocols and network types. The network may include a single local area network (LAN) or wide-area network (WAN), or combinations of LANs or WANs, such as the Internet. The various devices coupled to the network may be coupled to the network via one or more wired or wireless connections.

The occupant safety control platform 102 may communicate with a vehicle control platform 118. The vehicle control platform 118 may be a component of a larger architecture that controls various aspects of the vehicle's operation. The vehicle control platform 118 may have interfaces to autonomous driving control systems (e.g., steering, braking, acceleration, etc.), safety systems or occupant restraint systems (e.g., seat belt monitors, airbag controllers, etc.), comfort systems (e.g., heat, air conditioning, seat positioning, etc.), navigation interfaces (e.g., maps and routing systems, positioning systems, entertainment systems, etc.), collision avoidance systems, communication systems, security systems, vehicle status monitors (e.g., tire pressure monitor, oil level sensor, speedometer, etc.), and the like.

Using the occupant safety control platform 102, the vehicle control platform 118 may control one or more subsystems. For instance, the occupant safety control platform 102 may be used in a sensor fusion mechanism with other sensors (e.g., vehicle acceleration controls, braking controls, cameras, LiDAR, GPS, etc.), where the signals are used to augment, corroborate, or otherwise assist in activating or controlling safety restraints, airbag deployment, and the like.

A crash can be summarized into three stages: 1) initial contact, when the vehicles first touch; 2) maximum engagement, when the maximum deformation and intrusion occurs; and 3) separation, when the vehicles depart from one another. The ORS must be triggered after the first stage and at the beginning of the second stage—before maximum engagement occurs. The triggering must consider the amount of time needed to deploy the airbags. The decision is made in only 15 to 50 milliseconds (ms) for frontal collisions.

The occupant safety control platform 102 implements a framework for measuring in-cabin movement of vehicle occupants and fuses that information with impact sensor data to determine collisions and control airbag deployment. The framework is divided into three main stages: 1) Event Association, 2) Collision Detection, and 3) ORS Actuation.

The Event Association stage is where events from an event camera are associated with occupant body parts. When a person in a vehicle is part of a collision, the person's body will move differently than the rest of the vehicle. This relative movement is captured by an event camera due to the changes in luminosity. In a collision, events are generated by the entire scene (background) and the moving occupants because the camera moves due to the crash conditions. The key idea here is that the velocity of the background events is the same and the events generated by the occupants' body motion are also the same, but are different from the background.

During a collision, the image processor 108 receives data from event cameras 116 that are installed in the vehicle 104. This data is in the form of event messages. As such, the image processor 108 parses, stores, and analyzes the event messages. Data derived from the event messages is sent to the occupant safety system controller 110 for further analysis. Occupant safety system controller 110 may be a component of or work with an occupant restraint system (ORS).

During the Event Association stage, the velocity vector of the events with respect to time is calculated. For instance, a set of time-dependent events, regardless of increase or decrease, is used to calculate a velocity vector that relates the sequence of each event. Then, the velocity of each event is used as an error function to generate N clusters. Finally, the background is removed. At the next iteration, the velocity calculated for the new events must be aligned with the previous velocity to make the movement consistent. The output of the algorithm is a cluster of N groups of events that move at the same velocity. The events are clustered and then classified. This is discussed in more detail in FIG. 3 below.

In the Collision Detection stage, the collision is detected and validated using the impact sensors 114 and the clusters of events generated in the Event Association stage. Impact data, such as impact force and directions, that are detected by the impact sensors 114 installed on or around the vehicle 104, are provided to the occupant safety system controller 110. From impact sensor data (e.g., IMU acceleration data), the jerk is computed. The time derivative of the acceleration is calculated, which is a sliding-mode differentiator, where f(t) represents the acceleration, $z_0, z_1, z_2, \ldots, z_n$ represent the states of the differentiator ($z_0$ corresponds to the filtered acceleration and $\dot{z}_0$ corresponds to the jerk signal), and $\lambda_0, \lambda_1, \ldots, \lambda_n$ and L are tuning gains. The following set of equations are used to calculate jerk for each state of the differentiator.

$$\dot{z}_0 = -\tilde{\lambda}_n L^{\frac{1}{n+1}} \lfloor z_0 - f(t) \rceil^{\frac{n}{n+1}} + z_1,$$
$$\dot{z}_1 = -\tilde{\lambda}_{n-1} L^{\frac{2}{n+1}} \lfloor z_0 - f(t) \rceil^{\frac{n-1}{n+1}} + z_2,$$
$$\dot{z}_2 = -\tilde{\lambda}_{n-2} L^{\frac{3}{n+1}} \lfloor z_0 - f(t) \rceil^{\frac{n-2}{n+1}} + z_3,$$
$$\ldots$$
$$\dot{z}_{n-1} = -\tilde{\lambda}_n L^{\frac{n}{n+1}} \lfloor z_0 - f(t) \rceil^{\frac{1}{n+1}} + z_n,$$
$$\dot{z}_n = -\tilde{\lambda}_0 L \, \text{sign}(z_0 - f(t)).$$

Figure 2:
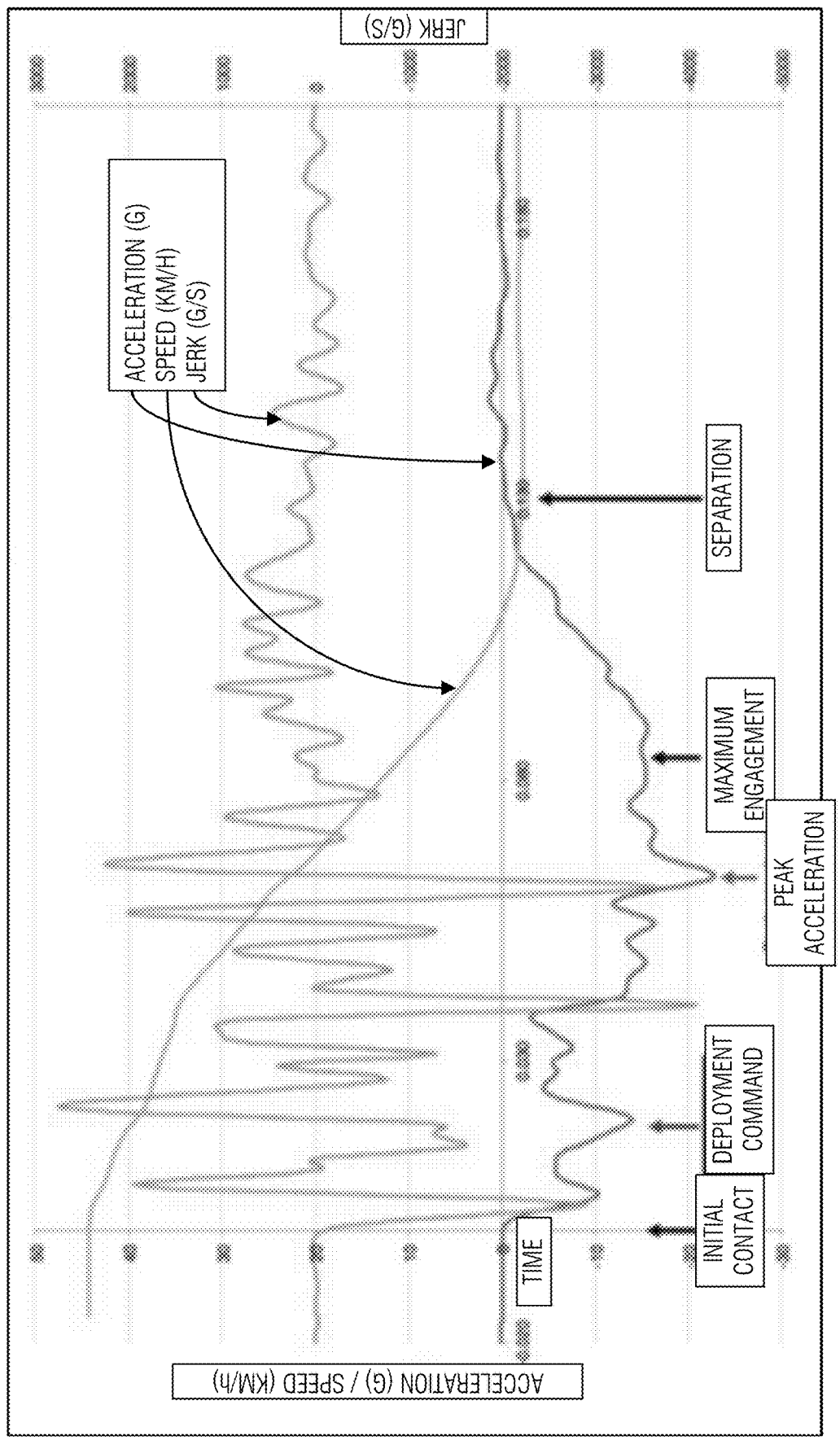
FIG. 2 illustrates collision stages and motion data over time, according to an embodiment.

Then, the corresponding stages are detected, given the magnitude of the jerk signals. This is illustrated in FIG. 2 which shows the collision stages and motion data over time.

To validate the crash, the velocity vector detected in the background cluster of events that matches the axis is correlated to the magnitude of the collision detected. The validation will trigger the activation signal for the airbags or other mechanisms. The background cluster of events are the events that are not associated with the occupants in the vehicle. In a crash, some parts of the cabin will acquire a relative velocity with respect to the event camera. The redundancy for impact detection reduces the likelihood of false positives and mistakenly activating an airbag.

The last phase is ORS Actuation. The occupant safety system controller 110 may use the impact measurements in combination with the data from the image processor 108 to control activation of one or more airbags in the vehicle 104. When the anti-collision mechanism has been triggered and the velocity of the occupants calculated, the directional velocity of each occupant is used to decide which airbags and how to activate airbags in synchrony with the magnitude of the velocity of each occupant.

Figure 3:
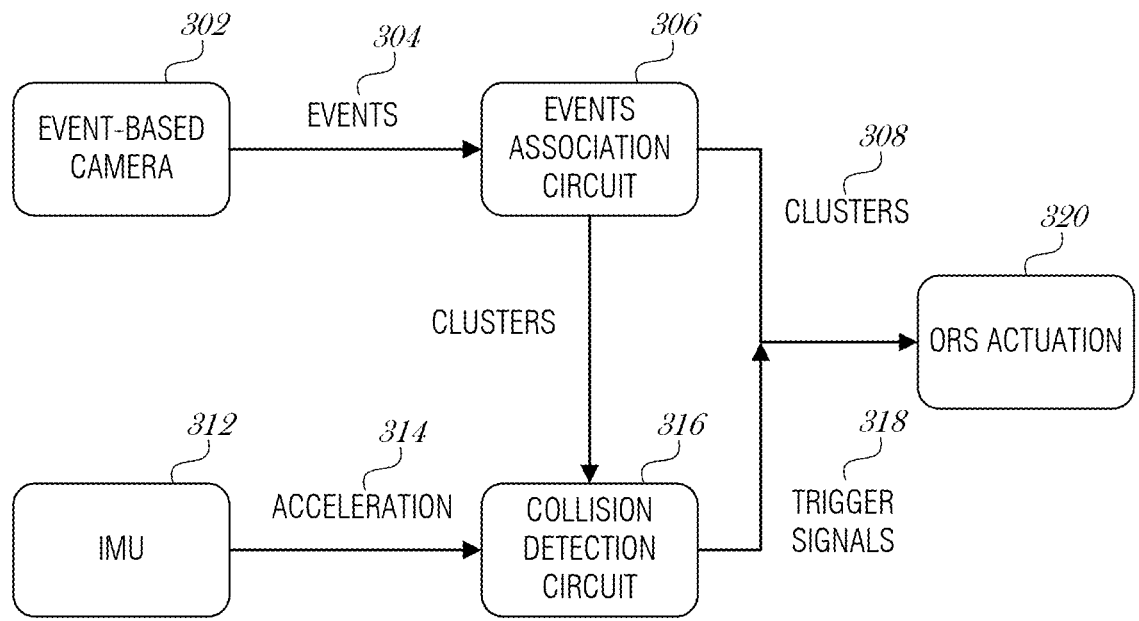
FIG. 3 is a block diagram illustrating control and data flow in a system, according to an embodiment.

FIG. 3 is a block diagram illustrating control and data flow in a system, according to an embodiment. One or more event cameras 302 are used to monitor passengers in a cabin.

When luminosity of a pixel changes more than a threshold amount, an event 304 is generated. Events 304 are transmitted to an event association circuit 306, which captures, stores, and clusters the events. The clusters 308 are transmitted to an ORS activation circuit 320.

One or more IMUs 312 are used to monitor acceleration. The acceleration measurements 314 are transmitted to a collision detection circuit 316. The acceleration measurements 314 are used to compute jerk. Based on threshold values, a collision is indicated through trigger signal 318. The trigger signals are transmitted to the ORS activation circuit 320. The ORS activation circuit 320 actuates the passenger restraint systems in synchrony with the movement of the occupants' motion.

Figure 4:
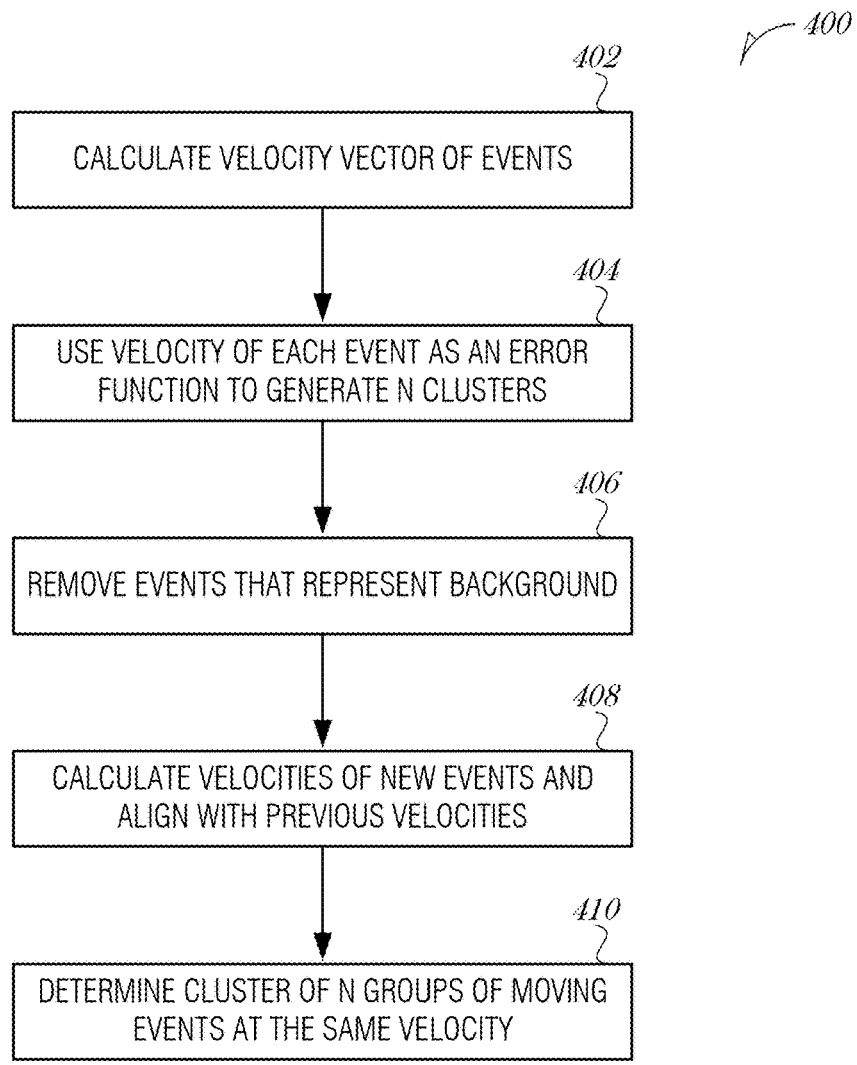
FIG. 4 is a flowchart illustrating a method for clustering events, according to an embodiment.

FIG. 4 is a flowchart illustrating a method 400 for clustering events, according to an embodiment. As described above, the velocity vector of events with respect to time is calculated (block 402). Then, the velocity of each event is used as an error function to generate N clusters (block 404). The background is removed (block 406). In particular, those events with low relative velocity that represent the background of the scene are removed. At the next iteration, the velocities are calculated for new events and are aligned with the previous velocities to make movement consistent (block 408). As a result, a cluster of N groups of moving events, each moving at the same velocity is determined (block 410).

To generate the clusters in operation 404, two classes of event classification are used: 1) a background movement classification and 2) an occupant movement classification. Movement of the background with respect to the event camera should be minimal (e.g., minimal changes in velocity corresponding with minimal changes in illumination).

Figure 5:
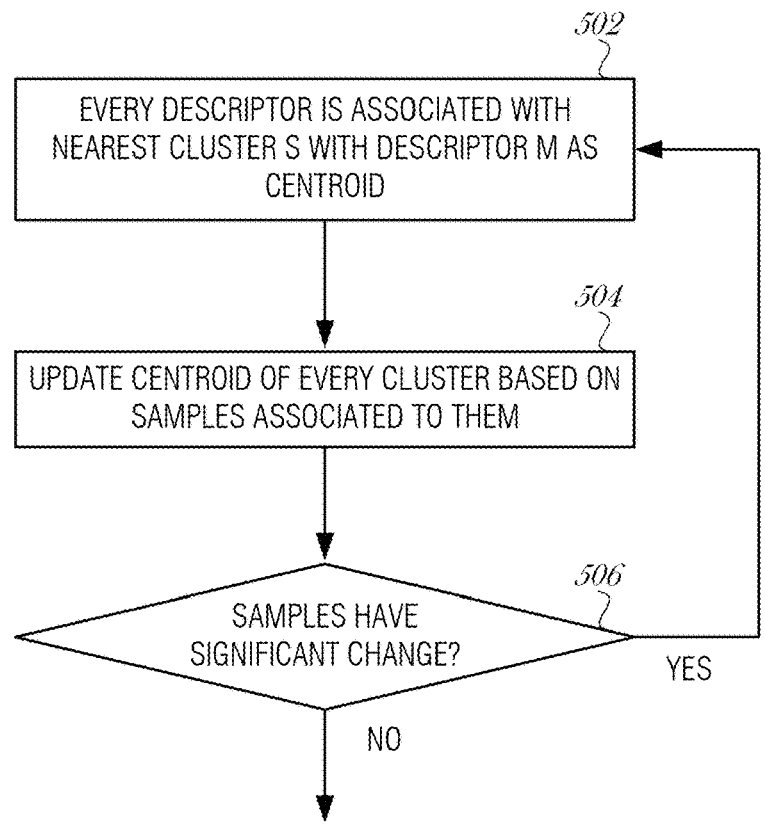
FIG. 5 illustrates a method for clustering events, according to an embodiment.

FIG. 5 illustrates a method 500 for clustering events, according to an embodiment. Here $\sigma_1$=j-th event pixel position. At 502, every descriptor $\sigma_j$ is associated with nearest cluster S with descriptor m as centroid. This is performed using the following equation.

$$s_i^{(t)} = \{\sigma_p : \|\sigma_p - m_i^{(t)}\| \leq \|\sigma_p - m_j^{(t)}\| \forall 1 \leq j \leq k\}$$

At 504, the centroids of every cluster are updated based on the samples associated to them. This is performed using the following equation.

$$m_i^{(t+1)} = \text{Round}\left(\frac{1}{|S_i^{(t)}|} \sum_{\sigma_j \in S_i^{(t)}} \sigma_j\right)$$

At 506, if samples do not have a significant change, then it means that the system is in a stable state and the method 500 exits. On the contrary, the association operation 502 is repeated. To test whether the sample has significant change, the following equation may be used.

$$m_i^{(t+1)} = m_i^{(t)} \forall 1 \leq i \leq k\}$$

Figure 6:
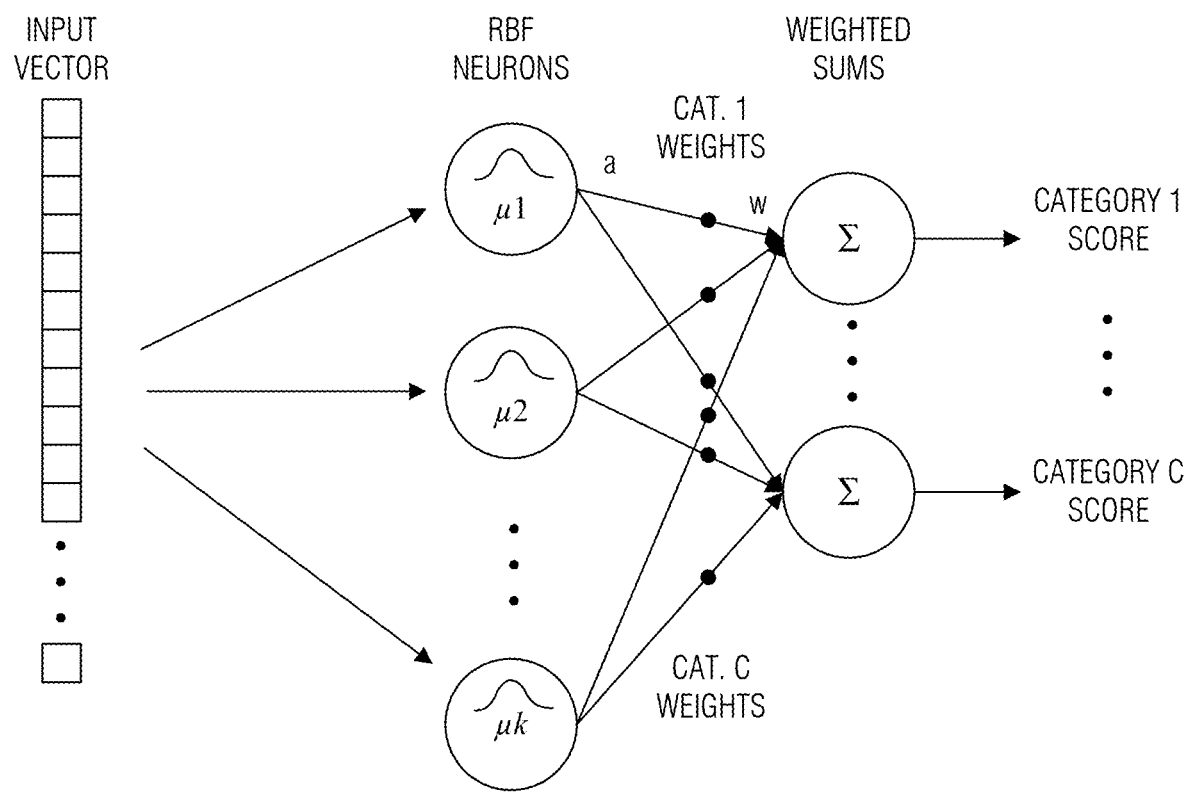
FIG. 6 illustrates an architecture of a neural network, according to an embodiment.

Patterns are classified using a neural network, such as one illustrated in FIG. 6. In particular, clusters are classified as occupant or background using a neural network. The input vector includes a fixed set of clusters, with any quadratic shape. Here, a radial basis function (RBF) neural network (NN) is illustrated, but it is understood that any other type of network may be used.

The NN illustrated in FIG. 6 is a basic architecture in which the number of neurons in the hidden layer is k. The architecture is based in radial basis function in the hidden layer and fully connected layers for the final layer. The term $\mu$ represents the centroid of the hyper-spheroid (a gaussian for 2D). The term w represents the weights of the output layer, the term a represents the outputs from the Gaussian neurons and, the term o is the output of the final layer. The system will increase or decrease the number of neurons depending on the number of roots detected in the derivative of the error function.

The total error E is given by:

$$E = \frac{1}{2} \sum_{i=1}^{N} (d_i - o_i)^2$$

Where $d_i$ is the desired, expected value, and $o_i$ is given by:

$$o_i = \sum_{j=1}^{k} w_j a_{ij}$$

and $a_{ij}$ is defined by:

$$a_{ij} = e^{-\Sigma_{l=1}^{D}(x_{il} - \mu_{jl})^2}$$

Then, the error E partial derivative is:

$$f(\mu_{il}) = \frac{\partial E}{\partial \mu_{jl}} = 2 \sum_{i=1}^{N} (d_i - o_i) w_j a_{ij} (x_{il} - \mu_{jl})$$

Because the function is defined as the derivative of the error:

$$f(\mu_{il}) = \frac{\partial E}{\partial \mu_{jl}}$$

The, the derivative is denoted as:

$$f'(u_{jl}) = \sum_{i=1}^{N} \left( \frac{f(\mu_{jl})^2}{(d_i - o_i)^2} + 2p(x_{il} - \mu_{jl}) - \frac{f(\mu_{jl})}{x_{il} - \mu_{jl}} \right)$$

and:

$$f''(\mu_{jl}) = \frac{2f(\mu_{jl})f'(\mu_{jl})(d_i - o_i) + 4f(\mu_{jl})^2 w_j a_j (x_{il} - \mu_{jl})}{(d_i - o_i)^3} + s$$

where S is:

$$s = \sum_{n=0}^{3} (x_{il} - \mu_{jl})^{(1-n)} V_n$$

and:

$$V = [2f'(u_{jl}), -2f(u_{jl}), -f'(u_{jl}), -f(u_{jl})]$$

Now the ratios can be computed as:

$$r_1 = \frac{f(a)}{f'(a)}, r_2 = \frac{f(a)}{f''(a)}, \text{ and}$$

$$r_3 = \frac{f'(a)}{f''(a)}$$

Figure 7:
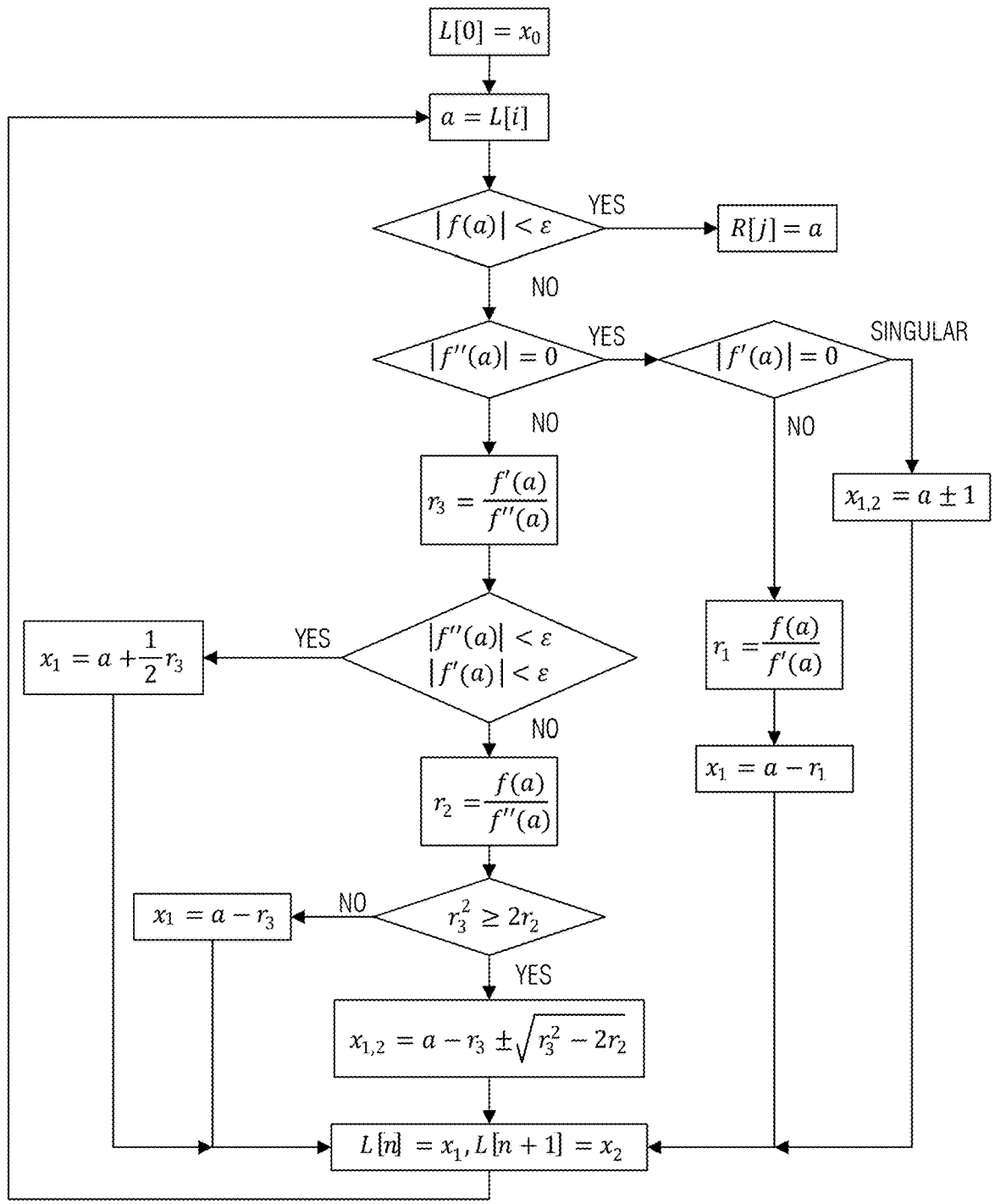
FIG. 7 is flowchart illustrating a method to find the roots of the derivative of the error function, according to an embodiment.

These ratios are used in the method illustrated in FIG. 7 to find the roots of the derivative of the error function. The roots found are proportional to the number of neurons needed by the NN to solve the problem.

FIGS. 8A-F illustrate an example of how the neural network topology adapts by reducing the number of neurons. These are not intended to show accuracy of any performance. The scenario displayed consists of features in a 2D space for visualization purposes. The number of randomly initialized neurons is set high for the task, using an initial 60 neurons that are more than needed to solve the problem.

Figure 8A:
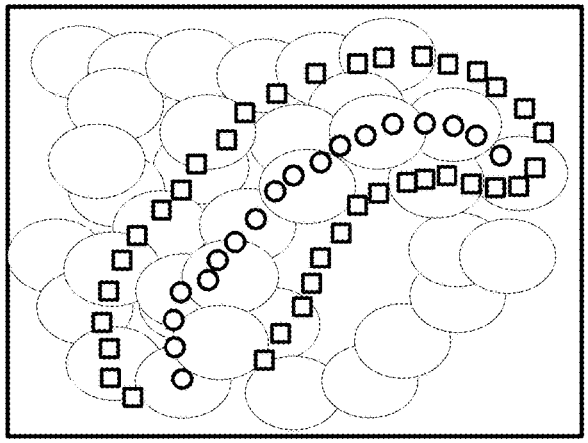
FIGS. 8A-F illustrate examples of how a neural network topology adapts by reducing a number of neurons, according to an embodiment.
Figure 8B:
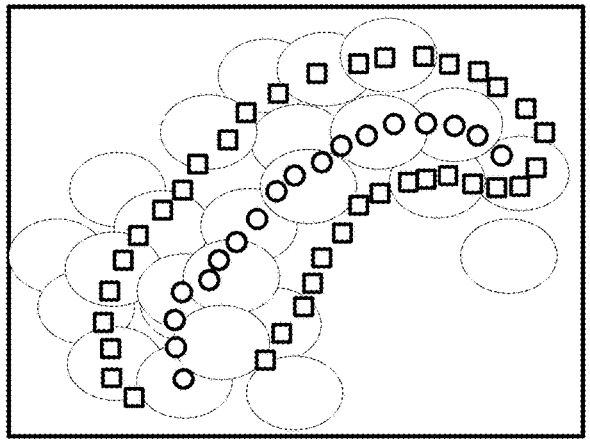
Figure 8C:
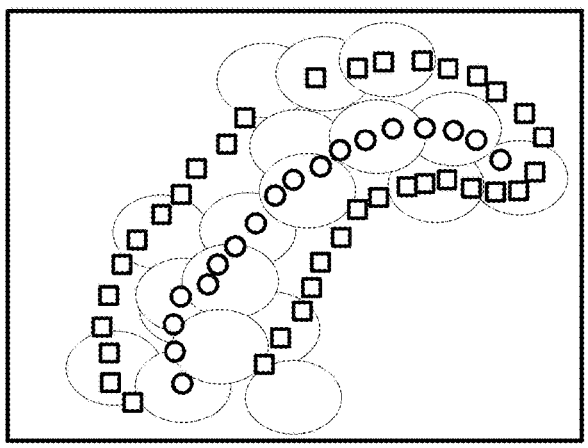
Figure 8D:
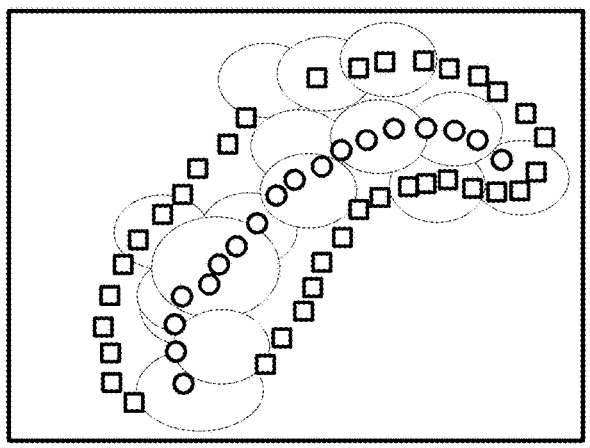
Figure 8E:
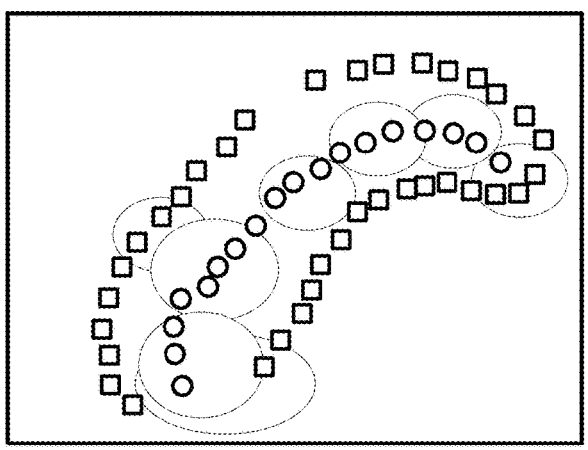
Figure 8F:
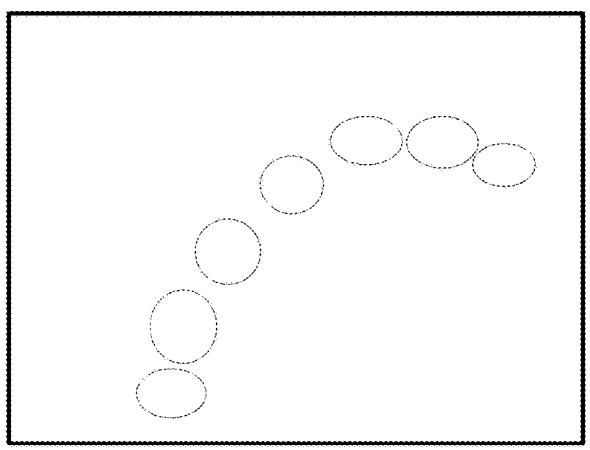

The NN is trained to correctly classify between the 'circle' dots and the 'square' dots. White circles represent each 2D RBF neuron distribution. As can be seen in the following sequence of plots shown in FIGS. 8A-E, the number of neurons decreases while the NN is being trained and the error decreases, based on merging the neurons on the same E' root. The final plot in FIG. 8F shows the evaluation of the network pixel by pixel, illustrating a final optimized number of resources (nine neurons) for this problem.

Figure 9A:
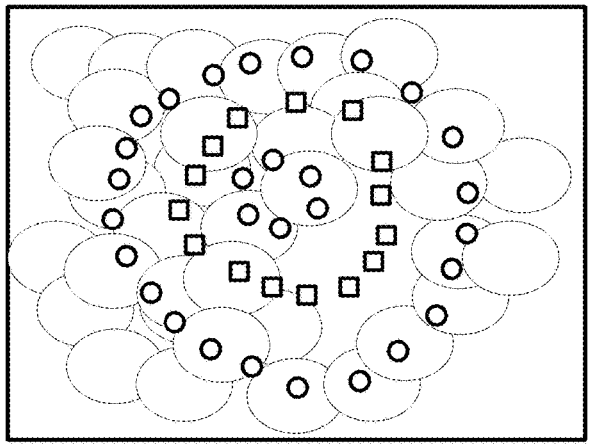
FIGS. 9A-D illustrates another example of how a neural network topology adapts by reducing the number of neurons, according to an embodiment.
Figure 9B:
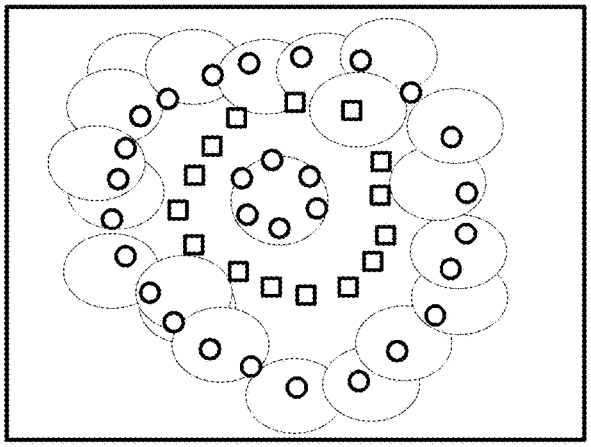
Figure 9C:
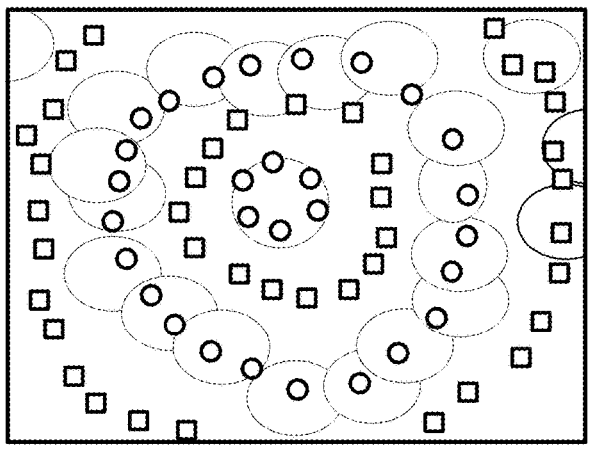
Figure 9D:
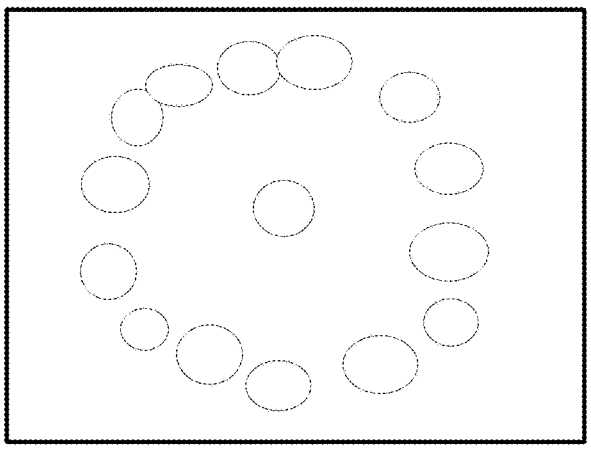

FIGS. 9A-D illustrate another example of how the neural network topology adapts by reducing the number of neurons. In this example, the system was initialized randomly with 60 neurons, but data was distributed in a more nonlinear way. During this training, more data was added on the fly as illustrated in FIG. 9C. Similarly as shown in the previous example, the weights were adjusted moving the neurons to the roots of E' and minimizing the error and the number of neurons needed to solve the problem.

Figure 10:
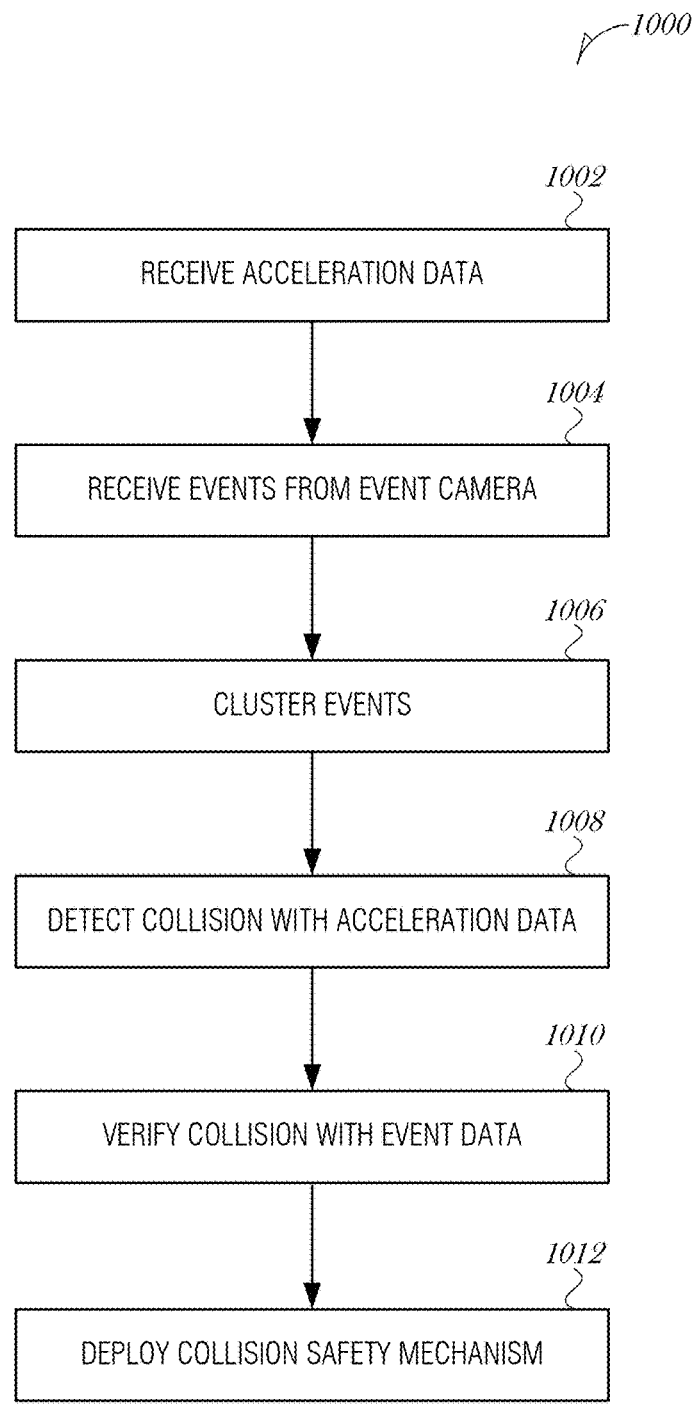
FIG. 10 is a flowchart illustrating a method for controlling deployment of vehicle safety mechanisms, according to an embodiment.

FIG. 10 is a flowchart illustrating a method 1000 for controlling deployment of vehicle safety mechanisms, according to an embodiment.

At 1002, acceleration data is received from an impact sensor. In an embodiment, acceleration data includes three-axis acceleration data. The acceleration data may include linear or angular acceleration. In another embodiment, six-axis acceleration data may be used including linear acceleration in x, y, and z axis and the angular acceleration in z axis. Because normal IMUs only measure the angular velocity, the algorithm above described in the Collision Detection stage is used to obtain the time derivative.

At 1004, events from an event camera are received. The event camera is configured to monitor a scene of an interior of the host vehicle that includes an occupant. In an embodiment, an event from the event camera is triggered when a luminance change of a pixel of the event camera increases or decreases more than a threshold amount. In a further embodiment, the event includes an address of the pixel that detected the luminance change, and a time stamp of the luminance change. The luminance change may be correlated with a negative acceleration measured from the IMU to avoid false events when driving under a canopy, for instance.

At 1006, the events are clustered to discriminate between events associated with a background of the scene and events associated with a body part of the occupant. In an embodiment, clustering the events includes calculating a velocity vector of the events with respect to time, using the velocity of each event as an error function to generate N clusters, and removing clusters that represent the background of the scene.

In another embodiment, the clustering is performed with a neural network that is configured to increase or decrease a number of neurons used depending on a number of roots detected in a derivative of an error function.

At 1008, a collision is detected based on the acceleration data.

At 1010, the collision is verified based on the events associated with the background of the scene. In an embodiment, detecting a collision based on the acceleration data includes computing a jerk based on the acceleration data, determining that the jerk exceeds a threshold, and in response to determining that the jerk exceeds the threshold, determining the collision exists. In an embodiment, verifying the collision based on the events associated with the background of the scene includes calculating a velocity of the background and determining that the velocity of the background matches an axis and magnitude of the collision provided by the acceleration data.

At 1012, in response to verifying the collision, a collision safety mechanism of the host vehicle is caused to deploy. In an embodiment, the collision safety mechanism includes an airbag. In an embodiment, actuating the airbag includes calculating a velocity of the body part of the occupant, determining a magnitude of the velocity of the body part of the occupant, and actuating the airbag corresponding with the magnitude and velocity of the velocity.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the -readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

Figure 11:
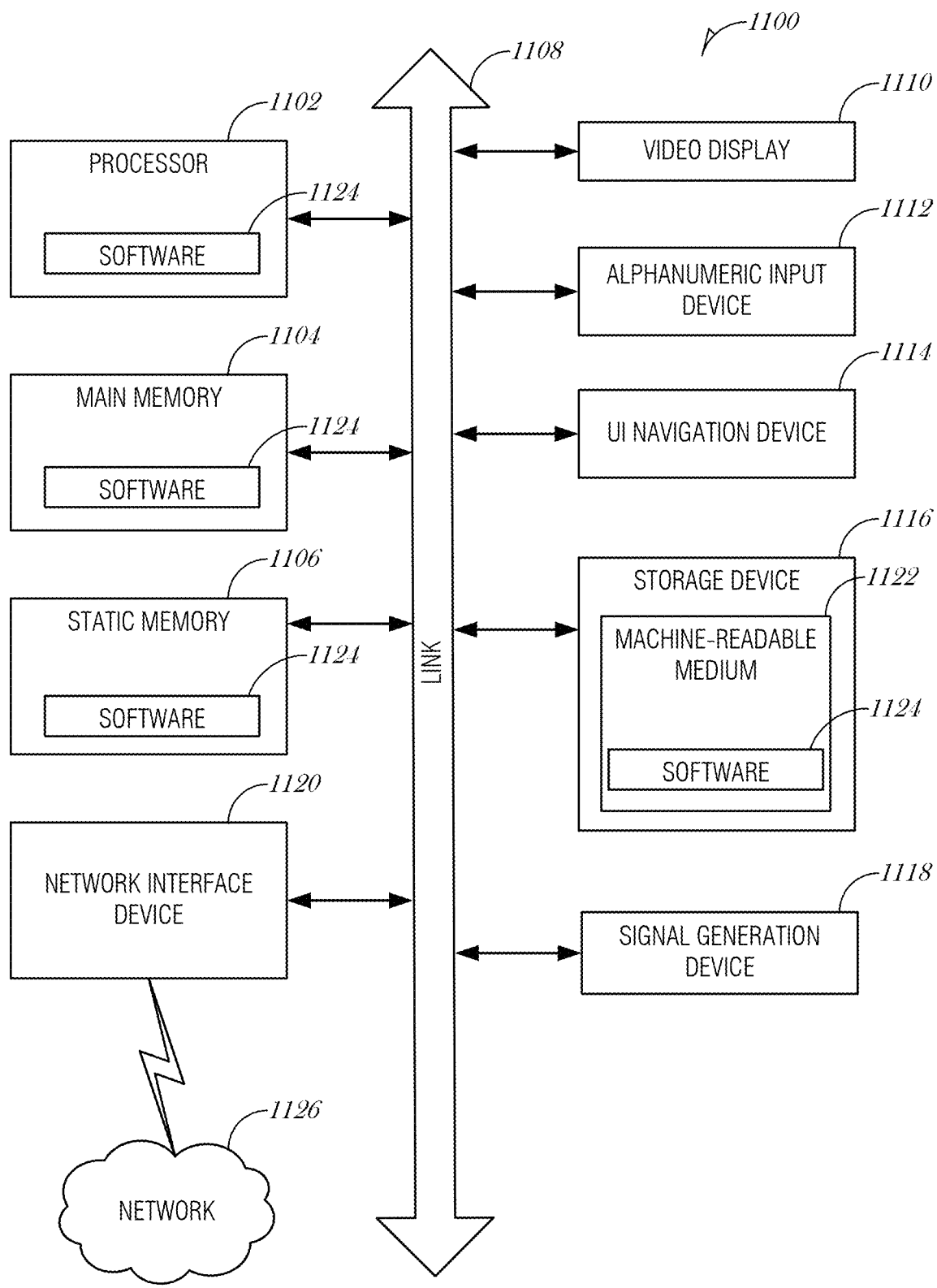
FIG. 11 is a block diagram illustrating an example machine upon which any one or more of the techniques (e.g., methodologies) discussed herein may perform, according to an embodiment.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture FIG. 11 is a block diagram illustrating a machine in the example form of a computer system 1100, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a vehicle subsystem, a vehicle occupant restraint system, a vehicle safety system, a personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1100 includes at least one processor 1102 (e.g., a central processing unit (CPU), a graphics processing unit (GPU) or both, processor cores, compute nodes, etc.), a main memory 1104 and a static memory 1106, which communicate with each other via a link 1108 (e.g., bus). The computer system 1100 may further include a video display unit 1110, an alphanumeric input device 1112 (e.g., a keyboard), and a user interface (UI) navigation device 1114 (e.g., a mouse). In one embodiment, the video display unit 1110, input device 1112 and UI navigation device 1114 are incorporated into a touch screen display. The computer system 1100 may additionally include a storage device 1116 (e.g., a drive unit), a signal generation device 1118 (e.g., a speaker), a network interface device 1120, and one or more sensors (not shown), such as a global positioning system (GPS) sensor, compass, accelerometer, gyrometer, magnetometer, or other sensor.

The storage device 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104, static memory 1106, and/or within the processor 1102 during execution thereof by the computer system 1100, with the main memory 1104, static memory 1106, and the processor 1102 also constituting machine-readable media.

While the machine-readable medium 1122 is illustrated in an example embodiment to be a single medium, the term "machine-readable medium" may include a single medium or multiple media (e.g., a centralized or distributed database, and/or associated caches and servers) that store the one or more instructions 1124. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include nonvolatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1124 may further be transmitted or received over a communications network 1126 using a transmission medium via the network interface device 1120 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 is a system for controlling deployment of vehicle safety mechanisms of a host vehicle, comprising: a sensor array interface to receive acceleration data from an impact sensor; an image processor to receive events from an event camera, the event camera configured to monitor a scene of an interior of the host vehicle that includes, an occupant; and an occupant safety system controller to: cluster the events to discriminate between events associated with a background of the scene and events associated with a body part of the occupant; detect a collision based on the acceleration data; verify the collision based on the events associated with the background of the scene; and in response to verifying the collision, cause a collision safety mechanism of the host vehicle to deploy.

In Example 2, the subject matter of Example 1 includes, wherein the acceleration data includes three-axis acceleration data.

In Example 3, the subject matter of Examples 1-2 includes, wherein an event from the event camera is triggered when a luminance change of a pixel of the event camera increases or decreases more than a threshold amount.

In Example 4, the subject matter of Example 3 includes, wherein the event includes an address of the pixel that detected the luminance change, and a time stamp of the luminance change.

In Example 5, the subject matter of Examples 1–4 includes, wherein to cluster the events, the occupant safety system controller is to: calculate a velocity vector of the events with respect to time; use the velocity of each event as an error function to generate N clusters; and remove clusters that represent the background of the scene.

In Example 6, the subject matter of Examples 1-5 includes, wherein the clustering is performed with a neural network that is configured to increase or decrease a number of neurons used depending on a number of roots detected in a derivative of an error function.

In Example 7, the subject matter of Examples 1-6 includes, wherein to detect a collision based on the acceleration data, the occupant safety system controller is to: compute a jerk based on the acceleration data; determine that the jerk exceeds a threshold; and in response to determining that the jerk exceeds the threshold, determine the collision exists.

In Example 8, the subject matter of Examples 1-7 includes, wherein to verify the collision based on the events associated with the background of the scene, the occupant safety system controller is to: calculate a velocity of the background; and determine that the velocity of the background matches an axis and magnitude of the collision provided by the acceleration data.

In Example 9, the subject matter of Examples 1-8 includes, wherein to cause a collision safety mechanism of the host vehicle to deploy, the safety system controller is to actuate an airbag.

In Example 10, the subject matter of Example 9 includes, wherein to actuate the airbag, the occupant safety system controller is to: calculate a velocity of the body part of the occupant; determine a magnitude of the velocity of the body part of the occupant; and actuate the airbag corresponding with the magnitude and velocity of the velocity.

Example 11 is a method for controlling deployment of vehicle safety mechanisms of a host vehicle, comprising: receiving acceleration data from an impact sensor; receiving events from an event camera, the event camera configured to monitor a scene of an interior of the host vehicle that includes, an occupant; clustering the events to discriminate between events associated with a background of the scene and events associated with a body part of the occupant; detecting a collision based on the acceleration data; verifying the collision based on the events associated with the background of the scene; and in response to verifying the collision, cause a collision safety mechanism of the host vehicle to deploy.

In Example 12, the subject matter of Example 11 includes, wherein the acceleration data includes three-axis acceleration data.

In Example 13, the subject matter of Examples 11-12 includes, wherein an event from the event camera is triggered when a luminance change of a pixel of the event camera increases or decreases more than a threshold amount.

In Example 14, the subject matter of Example 13 includes, wherein the event includes an address of the pixel that detected the luminance change, and a time stamp of the luminance change.

In Example 15, the subject matter of Examples 11-14 includes, wherein clustering the events comprises: calculating a velocity vector of the events with respect to time; using the velocity of each event as an error function to generate N clusters; and removing clusters that represent the background of the scene.

In Example 16, the subject matter of Examples 11-15 includes, wherein the clustering is performed with a neural network that is configured to increase or decrease a number of neurons used depending on a number of roots detected in a derivative of an error function.

In Example 17, the subject matter of Examples 11-16 includes, wherein detecting a collision based on the acceleration data comprises: computing a jerk based on the acceleration data; determining that the jerk exceeds a threshold; and in response to determining that the jerk exceeds the threshold, determining the collision exists.

In Example 18, the subject matter of Examples 11-17 includes, wherein verifying the collision based on the events associated with the background of the scene comprises: calculating a velocity of the background; and determining that the velocity of the background matches an axis and magnitude of the collision provided by the acceleration data.

In Example 19, the subject matter of Examples 11-18 includes, wherein causing a collision safety mechanism of the host vehicle to deploy comprises actuating an airbag.

In Example 20, the subject matter of Example 19 includes, wherein actuating the airbag comprises: calculating a velocity of the body part of the occupant; determining a magnitude of the velocity of the body part of the occupant; and actuating the airbag corresponding with the magnitude and velocity of the velocity.

Example 21 is at least one machine-readable medium including instructions, which when executed by a machine, cause the machine to perform operations of any of the methods of Examples 11-20.

Example 22 is an apparatus comprising means for performing any of the methods of Examples 11-20.

Example 23 is at least one machine-readable medium including instructions for controlling deployment of vehicle safety mechanisms of a host vehicle, which when executed by a machine, cause the machine to perform operations comprising: receiving acceleration data from an impact sensor; receiving events from an event camera, the event camera configured to monitor a scene of an interior of the host vehicle that includes, an occupant; clustering the events to discriminate between events associated with a background of the scene and events associated with a body part of the occupant; detecting a collision based on the acceleration data; verifying the collision based on the events associated with the background of the scene; and in response to verifying the collision, cause a collision safety mechanism of the host vehicle to deploy.

In Example 24, the subject matter of Example 23 includes, wherein the acceleration data includes three-axis acceleration data.

In Example 25, the subject matter of Examples 23-24 includes, wherein an event from the event camera is triggered when a luminance change of a pixel of the event camera increases or decreases more than a threshold amount.

In Example 26, the subject matter of Example 25 includes, wherein the event includes an address of the pixel that detected the luminance change, and a time stamp of the luminance change.

In Example 27, the subject matter of Examples 23-26 includes, wherein the instructions for clustering the events comprise instructions for: calculating a velocity vector of the events with respect to time; using the velocity of each event as an error function to generate N clusters; and removing clusters that represent the background of the scene.

In Example 28, the subject matter of Examples 23-27 includes, wherein the clustering is performed with a neural network that is configured to increase or decrease a number of neurons used depending on a number of roots detected in a derivative of an error function.

In Example 29, the subject matter of Examples 23-28 includes, wherein the instructions for detecting a collision based on the acceleration data comprise instructions for: computing a jerk based on the acceleration data; determining that the jerk exceeds a threshold; and in response to determining that the jerk exceeds the threshold, determining the collision exists.

In Example 30, the subject matter of Examples 23-29 includes, wherein the instructions for verifying the collision based on the events associated with the background of the scene comprise instructions for: calculating a velocity of the background; and determining that the velocity of the background matches an axis and magnitude of the collision provided by the acceleration data.

In Example 31, the subject matter of Examples 23-30 includes, wherein the instructions for causing a collision safety mechanism of the host vehicle to deploy comprise instructions for actuating an airbag.

In Example 32, the subject matter of Example 31 includes, wherein the instructions for actuating the airbag comprise instructions for: calculating a velocity of the body part of the occupant; determining a magnitude of the velocity of the body part of the occupant; and actuating the airbag corresponding with the magnitude and velocity of the velocity.

Example 33 is at least one machine-readable medium including instructions that, when executed by processing circuitry, cause the processing circuitry to perform operations to implement of any of Examples 1-32.

Example 34 is an apparatus comprising means to implement of any of Examples 1-32.

Example 35 is a system to implement of any of Examples 1-32.

Example 36 is a method to implement of any of Examples 1-32.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system, comprising:
an image processor to receive events from an event camera, the event camera configured to monitor a scene of an interior of a host vehicle that includes an occupant; and
an occupant safety system controller to:
cluster the events to discriminate between events associated with a background of the scene and events associated with a body part of the occupant;
detect a collision based on acceleration data from an impact sensor;
verify the collision based on the events associated with the background of the scene by:
calculating a velocity of the events associated with the background, wherein the events associated with the background are events that are not associated with occupants in the host vehicle; and
determining that the velocity of the events associated with the background matches an axis and magnitude of the collision provided by the acceleration data; and
in response to verifying the collision, cause a collision safety mechanism of the host vehicle to deploy.

2. The system of claim 1, wherein the acceleration data includes three-axis acceleration data.

3. The system of claim 1, wherein an event from the event camera is triggered when a luminance change of a pixel of the event camera increases or decreases more than a threshold amount.

4. The system of claim 3, wherein the event includes an address of the pixel that detected the luminance change, and a time stamp of the luminance change.

5. The system of claim 1, wherein to cluster the events, the occupant safety system controller is to:
calculate a velocity vector of the events with respect to time;
use the velocity of each event as an error function to generate N clusters; and
remove clusters that represent the background of the scene.

6. The system of claim 1, wherein the clustering is performed with a neural network that is configured to increase or decrease a number of neurons used depending on a number of roots detected in a derivative of an error function.

7. The system of claim 1, wherein to detect a collision based on the acceleration data, the occupant safety system controller is to:
compute a jerk based on the acceleration data;
determine that the jerk exceeds a threshold; and
in response to determining that the jerk exceeds the threshold, determine the collision exists.

8. The system of claim 1, wherein to cause a collision safety mechanism of the host vehicle to deploy, the occupant safety system controller is to actuate an airbag.

9. The system of claim 8, wherein to actuate the airbag, the occupant safety system controller is to:
calculate a velocity of the body part of the occupant;
determine a magnitude of the velocity of the body part of the occupant; and
actuate the airbag corresponding with the magnitude and velocity of the velocity.

10. A method, comprising:
receiving acceleration data from an impact sensor installed in a host vehicle;
receiving events from an event camera, the event camera configured to monitor a scene of an interior of the host vehicle that includes an occupant;
clustering the events to discriminate between events associated with a background of the scene and events associated with a body part of the occupant;
detecting a collision based on the acceleration data;
verifying the collision based on the events associated with the background of the scene by:
calculating a velocity of the events associated with the background, wherein the events associated with the background are events that are not associated with occupants in the host vehicle; and
determining that the velocity of the events associated with the background matches an axis and magnitude of the collision provided by the acceleration data; and
in response to verifying the collision, cause a collision safety mechanism of the host vehicle to deploy.

11. The method of claim 10, wherein the acceleration data includes three-axis acceleration data.

12. The method of claim 10, wherein an event from the event camera is triggered when a luminance change of a pixel of the event camera increases or decreases more than a threshold amount.

13. The method of claim 12, wherein the event includes an address of the pixel that detected the luminance change, and a time stamp of the luminance change.

14. The method of claim 10, wherein clustering the events comprises:
calculating a velocity vector of the events with respect to time;
using the velocity of each event as an error function to generate N clusters; and
removing clusters that represent the background of the scene.

15. The method of claim 10, wherein the clustering is performed with a neural network that is configured to increase or decrease a number of neurons used depending on a number of roots detected in a derivative of an error function.

16. The method of claim 10, wherein detecting a collision based on the acceleration data comprises:
computing a jerk based on the acceleration data;
determining that the jerk exceeds a threshold; and
in response to determining that the jerk exceeds the threshold, determining the collision exists.

17. The method of claim 10, wherein causing a collision safety mechanism of the host vehicle to deploy comprises actuating an airbag.

18. The method of claim 17, wherein actuating the airbag comprises:
calculating a velocity of the body part of the occupant;
determining a magnitude of the velocity of the body part of the occupant; and
actuating the airbag corresponding with the magnitude and velocity of the velocity.

19. At least one non-transitory machine-readable medium including instructions, which when executed by a machine in a host vehicle, cause the machine to perform operations comprising:
receiving acceleration data from an impact sensor;

receiving events from an event camera, the event camera configured to monitor a scene of an interior of the host vehicle that includes an occupant;

clustering the events to discriminate between events associated with a background of the scene and events associated with a body part of the occupant;

detecting a collision based on the acceleration data;

verifying the collision based on the events associated with the background of the scene by:

calculating a velocity of the events associated with the background, wherein the events associated with the background are events that are not associated with occupants in the host vehicle; and determining that the velocity of the events associated with the background matches an axis and magnitude of the collision provided by the acceleration data; and in response to verifying the collision, cause a collision safety mechanism of the host vehicle to deploy.

20. The at least one machine-readable medium of claim 19, wherein an event from the event camera is triggered when a luminance change of a pixel of the event camera increases or decreases more than a threshold amount.

21. The at least one machine-readable medium of claim 20, wherein the event includes an address of the pixel that detected the luminance change, and a time stamp of the luminance change.

22. The at least one machine-readable medium of claim 19, wherein the instructions for clustering the events comprise instructions for:

calculating a velocity vector of the events with respect to time;

using the velocity of each event as an error function to generate N clusters; and removing clusters that represent the background of the scene.

23. The at least one machine-readable medium of claim 19, wherein the clustering is performed with a neural network that is configured to increase or decrease a number of neurons used depending on a number of roots detected in a derivative of an error function.

* * * * *